United States Patent [19]

Raskob

[11] 4,408,774
[45] Oct. 11, 1983

[54] TWO-WHEEL CART

[76] Inventor: Richard L. Raskob, 19835 Larkin Rd., Corcoran, Minn. 55340

[21] Appl. No.: 264,060

[22] Filed: May 15, 1981

[51] Int. Cl.³ .............................................. B62B 1/26
[52] U.S. Cl. ................................. 280/47.26; 220/1 T; D34/26
[58] Field of Search ............... 280/47.24, 47.26, 47.33, 280/47.28, 47.34, 47.29; 220/1 T; 29/401.1; 248/129, 147; 414/456; D34/24, 26; 211/49 R

[56] References Cited

U.S. PATENT DOCUMENTS

| D. 183,960 | 11/1958 | Carroll et al. | D34/24 |
| D. 256,423 | 8/1980 | Bacskay | 280/47.26 |
| 1,358,881 | 11/1920 | Sasin | 280/47.26 |
| 1,367,948 | 2/1921 | Curtin | 211/49 R |
| 2,308,045 | 1/1943 | Budwig | 280/47.33 |
| 2,634,933 | 4/1953 | Grimsley | 280/47.26 |
| 2,896,961 | 7/1959 | Low | 280/47.26 |
| 2,925,206 | 2/1960 | Hancock | 211/49 R |
| 3,087,740 | 4/1963 | Mitty | 280/47.26 |

Primary Examiner—David M. Mitchell
Assistant Examiner—Timothy Roesch
Attorney, Agent, or Firm—Malcolm Reid

[57] ABSTRACT

Two-wheel cart including a 55-gallon oil drum having a tapered opening which restricts unwanted discharge in the standing position of wood such as fire logs and a cart frame with two wheels and a handle. The drum is fixedly mounted to the cart frame thereby providing a body member in which logs are capable of nesting for transportation.

4 Claims, 6 Drawing Figures

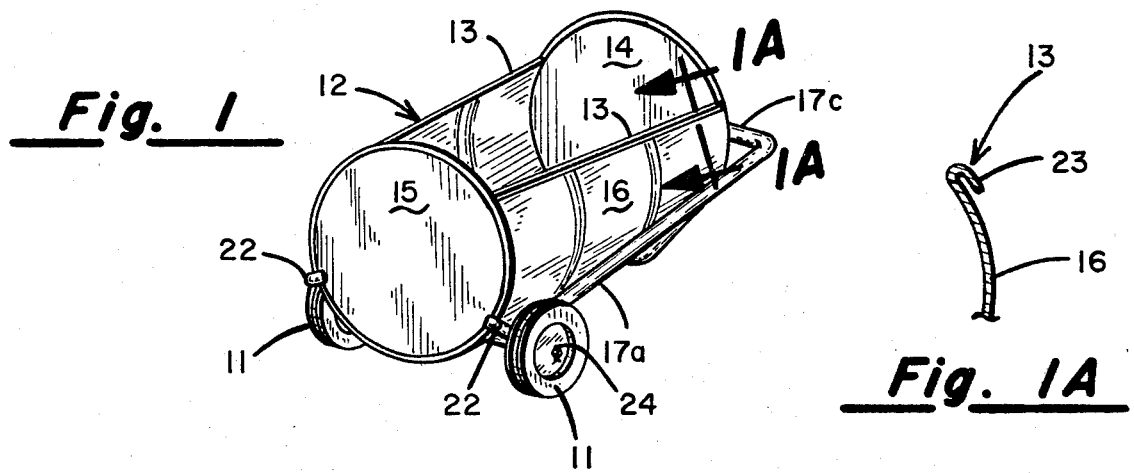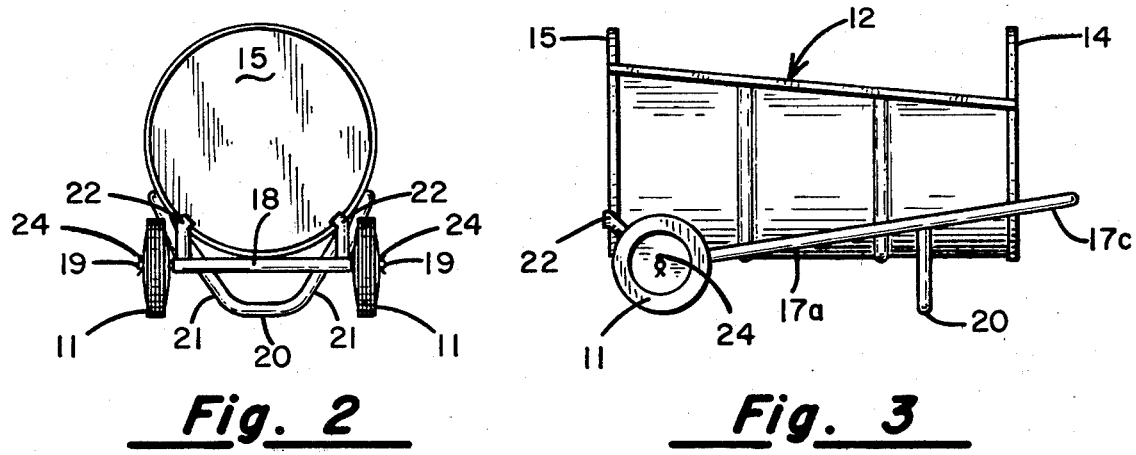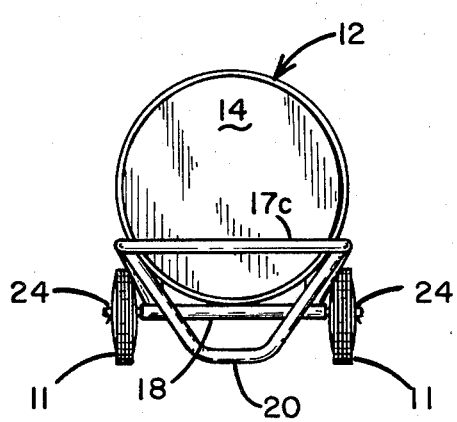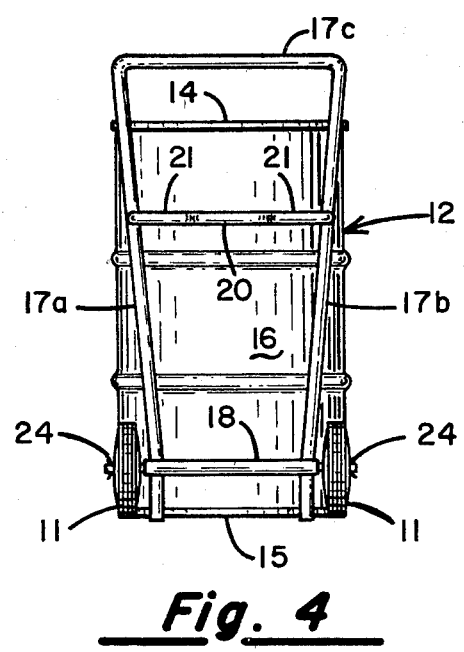

TWO-WHEEL CART

BACKGROUND OF THE INVENTION

1. Field of the Invention

The present invention pertains to a two-wheel cart and more particularly to a two-wheel cart having a standard oil drum with a tapered opening. The oil drum is fixedly mounted to a cart frame, thereby providing a body member in which logs are capable of nesting for transportation.

2. Description of the Prior Art

Prior art carts or caddys have usually consisted of a body member which allows the logs to easily slip out of the body member while they are being transported. Prior art carts also use body members which must be specially constructed.

The present invention overcomes the disadvantages of the prior art by using a readily available inexpensive drum as the body member having a tapered opening formed longitudinally along the circumferential wall of the drum. The tapered opening restricts unwanted discharge of firewood due to an interference fit between the tapered walls of the drum and the nested logs when the two-wheel cart is raised above a horizontal position or is in a standing position.

SUMMARY OF THE INVENTION

The general purpose of the present invention is to provide a two-wheel cart for transporting firewood which utilizes a readily available drum as the body member and an inexpensively constructed steel tube cart frame with two wheels attached to it.

According to one embodiment of the present invention, there is provided a two-wheel cart including a 55-gallon drum as the body member of the cart having a tapered opening formed longitudinally along the circumferential wall of the drum; a cart frame having an axle for rotatable mounting of a wheel on each end of the axle, a handle, a horizontal support member for resting the cart on a surface while it is in a horizontal position, a frame member to provide structural rigidity to the cart frame and body supports for attaching the cart frame to the body and two wheels.

A significant aspect and feature of the present invention is a two-wheel cart having a large body member which allows the two-wheel cart to carry a large load of material such as firewood.

Another significant aspect and feature of the present invention is a two-wheel cart that can be loaded in a horizontal position.

A further significant aspect and feature of the present invention is a two-wheel cart which allows a full load of fire logs to be transported without accidental spilling of the fire logs due to an interference fit between the nested logs and the tapered opening of the body member when the two-wheel cart is lifted into a partially upright position.

Another object of the present invention is to provide a two-wheel cart that is inexpensive to construct due to the use of existing oil drums as the body member.

Another object of the present invention is to provide a two-wheel cart which has a rugged cart frame.

Another object of the present invention is to provide a two-wheel cart which can be placed in a horizontal position and thereby used for storing logs.

BRIEF DESCRIPTION OF THE DRAWINGS

Other objects and many of the attendant advantages of the invention will be readily appreciated as the invention becomes better understood by reference to the following detailed description when considered in connection with the accompanying drawings, in which like reference numerals designate like parts throughout the figures thereof and wherein:

FIG. 1 illustrates a side perspective view of a two-wheel cart of the present invention with inset illustrating partial cross section of body along line AA showing folded circumferential wall;

FIG. 1A illustrates a partial cross section of the body along line AA showing the folded circumferential wall;

FIG. 2 illustrates a bottom view;

FIG. 3 illustrates a side view of the present invention in a horizontal position;

FIG. 4 illustrates a back view of the present invention in an upright position; and FIG. 5 illustrates a top view.

DESCRIPTION OF PREFERRED EMBODIMENTS

FIG. 1, which illustrates a side perspective view of a two-wheel cart 10 of the present invention in a horizontal position, shows wheels 11 and body member 12. A 55-gallon drum is illustrated by way of example and for purposes of illustration only as any suitable container of a similar shape can be used as the body member 12. The diameter of the wheels 11 is shown as small in relation to the diameter of the body member 12. However, this diameter ratio may be varied to almost any degree to suit the convenience for the intended use; the only constraint being that the diameter of the wheels 11 must be small enough that clearance is maintained between the wheels 11 and the body member 12. A tapered opening in body member 12 is defined by two opposed edges 13 which extend from the top 14 of the body member 12 to its bottom 15. The distance between the edges 13 is at a maximum at the top 14 of the body member 12 and decreases to a minimum at the bottom 15 of the body member 12. Edges 13 are reinforced by folding the circumferential wall 16 of the body member 12 back on itself forming folded metal wall 23. Handle member 17 forms part of a unitized cart frame which is affixed to the body member 12 and the axle 19.

FIG. 2, which illustrates a bottom view of the two-wheel cart, shows frame member 18, which is fixedly attached to handle member 17. Axle 19 is a steel shaft which is inserted through the center of hollow frame member 18. Axle 19 is of sufficient length that it extends beyond either end of frame member 18 thereby allowing for rotatable mounting of a wheel on each end of the axle 19. The axle 19 and the wheels 11 are held in place by the insertion of pins 24 transversely through the extreme ends of the axle 19. Horizontal support member 20 is attached to handle member 17 by angular members 21 at a point which is within the upper one-third of the body member 12. Horizontal support member 20 is in a plane which is parallel to the plane of frame member 18. The lower portion of the wall of horizontal support member 20 is in line with the point on the wheels 11 which contacts the surface on which the two-wheel cart is resting when the two-wheel cart is in a position as shown in FIG. 2. Horizontal support member 20 is attached to handle member 17 by angular members 21, both of which extend from the handle member 17 until they meet the horizontal support member 20 at an angle having its apex along a line which is an extended diameter of the body member 12. Body supports 22 extend from the junction point of the handle member 17 and the frame member 18 to points on the periphery of the bottom 15 of the body member 12 at which points they are attached to the body member 12.

FIG. 3 shows handle member 17 extending from the junction point of the handle member 17 and the frame member 18 (the actual junction point is not visible in FIG. 3, but is shown in FIG. 2) at an angle which extends upwards from the horizontal position and towards the extension of an axial line through the top 14 of the body member 12.

FIG. 4 illustrates a back view of the present invention in an upright position and shows handle member 17 extending from each of the previously mentioned junction points at an angle outwardly from those junction points so that the distance between the two sides 17a and 17b of handle member 17 and frame member 18 at the junction points is less than the corresponding distance at the handle 17c, thereby, in conjunction with frame member 18 and the two sides 17a and 17b of handle member 17, forming a cradle for body member 12. Handle member 17 is illustrated as a continuous member consisting of sides 17a and 17b and handle 17c. The angles at which the sides 17a and 17b extend is most preferably such that sides 17a and 17b are in contact with the circumferential wall 16 of body member 12 to the maximum extent possible.

FIG. 5 shows a top view of the present invention and illustrates the point of contact between the body member 12 and the frame member 18.

All attachment points between the cart frame members and between the cart frame and the body member 12 are preferably welds. All cart frame members are preferably made of round tube steel.

PREFERRED MODE OF OPERATION

The two-wheel cart of the present invention is utilized by raising the two-wheel cart by the handle 17c to a position between a fully upright position and a horizontal position. The two-wheel cart may then be easily wheeled to the desired location, such as a wood pile. The two-wheel cart may then be placed in a horizontal position as shown in FIG. 3 for loading material such as fire wood in the body member 12. Upon completion of loading, the cart is again raised, thereby shifting the firewood towards the bottom 15 of the body member 12. As the firewood shifts towards the bottom 15, it is wedged between the tapered edges 13, allowing the firewood to be wheeled over bumpy terrain without falling out of the cart. The large size of the body member 12 allows a large load of wood or other solid material to be transported. The large opening as defined by edges 13 allow convenient access to the body member 12 for loading and unloading.

Having thus described the invention, what is claimed is:

1. Two-wheel cart for transporting and storing a quantity of a given solid material, said two-wheel cart comprising:
   a. a body means including a closed cylinder having a tapered opening defined in its circumferential wall by two opposed edges which extend from the top of the body to the bottom of the body, the distance between the opposed edges being at a maximum at the top of the body and decreasing to a minimum at the bottom of the body;
   b. a cart frame including a handle member, an axle, and means for attaching the cart frame to the body; and
   c. two wheels rotatably attached to the cart frame axle.

2. Two-wheel cart of claim 1 wherein each of said opposed edges are reinforced by a folded metal wall attached along the length of each opposed edge.

3. Two-wheel cart of claim 1 wherein said cart frame includes a frame member attached to the cart frame in close proximity to the bottom of the body, extending transversely to a axis through the body, and in contact with the circumferential wall of the body.

4. Two-wheel cart of claim 1 wherein said cart frame includes a horizontal support member in close proximity to the top of the body and extending transversely to an axis through the body and being disposed between two opposed angular members, said angular members being fixedly attached to the cart frame and extending away from the body to such an extent that when the wheels of the cart and the horizontal support bar are in contact with a planar surface, the body is parallel to that surface.

* * * * *